(12) United States Patent
Lo et al.

(10) Patent No.: US 7,974,249 B2
(45) Date of Patent: Jul. 5, 2011

(54) VIRTUAL ACCESS POINT FOR CONFIGURATION OF A LAN

(75) Inventors: Yuan-Chang Lo, Austin, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 11/365,406

(22) Filed: Mar. 1, 2006

(65) Prior Publication Data
US 2007/0206527 A1    Sep. 6, 2007

(51) Int. Cl.
*H04Q 7/24* (2006.01)
(52) U.S. Cl. ......... 370/338; 370/401
(58) Field of Classification Search ......... None
See application file for complete search history.

(56) References Cited

U.S. PATENT DOCUMENTS

| | | | |
|---|---|---|---|
| 5,572,528 A | 11/1996 | Shuen | |
| 6,148,179 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,353,734 B1 | 3/2002 | Wright et al. | |
| 6,377,982 B1 | 4/2002 | Rai et al. | |
| 6,393,482 B1 | 5/2002 | Rai et al. | |
| 6,414,950 B1 | 7/2002 | Rai et al. | |
| 6,421,714 B1 | 7/2002 | Rai et al. | |
| 6,445,777 B1 | 9/2002 | Clark | |
| H2051 H | 11/2002 | Zhu et al. | |
| 6,512,754 B2 | 1/2003 | Feder et al. | |
| 6,577,643 B1 | 6/2003 | Rai et al. | |
| 2002/0022483 A1* | 2/2002 | Thompson et al. | 455/439 |
| 2004/0141617 A1 | 7/2004 | Volpano | |
| 2004/0181602 A1 | 9/2004 | Fink | |
| 2004/0214572 A1 | 10/2004 | Thompson et al. | |
| 2005/0160287 A1 | 7/2005 | Mehta et al. | |
| 2005/0165953 A1 | 7/2005 | Oba et al. | |

(Continued)

OTHER PUBLICATIONS

Harkins et al, "RFC 2409—The Internet Key Exchange (IKE)", Cisco Systems, Printed From Internet Feb. 18, 2006, http://www.faqs.org/rfcs/rfc2409.html, 28 pgs.

(Continued)

*Primary Examiner* — Phuoc Doan
(74) *Attorney, Agent, or Firm* — O'Keefe, Egan, Peterman & Enders LLP

(57) ABSTRACT

A technique is disclosed for setting up and configuring a LAN. More particularly, secure communications may be configured between an access point (AP) and a client device. Virtual AP technology is utilized to assist the configuration of the network. In particular, at least two wireless networks are provided in a single A, a configuration LAN and an operational LAN, by utilizing virtual AP technology. The configuration LAN is utilized to provide communication between the AP and the client devices that is related to network setup, configuration, modification, etc. and the operational LAN provides normal LAN data communication. The configuration LAN may be provided in a relatively insecure manner that eases setup of that communication channel and the operational LAN may be provided in a more fully secure communication channel. Different types of service set identifiers (SSIDs) may be provided for configuration LANs and operational LANs so as to more easily identify the type of LAN through its SSID.

30 Claims, 3 Drawing Sheets

U.S. PATENT DOCUMENTS

| | | |
|---|---|---|
| 2005/0261970 A1 | 11/2005 | Vucina et al. |
| 2006/0013159 A2 | 1/2006 | Gurevich |
| 2007/0106764 A1* | 5/2007 | Mansfield .................... 709/220 |
| 2007/0147318 A1* | 6/2007 | Ross et al. .................... 370/338 |
| 2008/0104399 A1* | 5/2008 | Fascenda ...................... 713/168 |

OTHER PUBLICATIONS

"VLAN Standarfization Via IEEE 801.10", Cisco, Printed From Internet Feb. 13, 2006, http://www.cisco.com/warp/public/537/6.html, 3 pgs.

* cited by examiner

VIRTUAL ACCESS POINT FOR CONFIGURATION OF A LAN

TECHNICAL FIELD OF THE INVENTION

This invention relates to connections between a wireless local area network (WLAN) client device and a wireless LAN access point (AP), and more particularly for setting up and configuring WLAN systems and devices.

BACKGROUND

Wireless local area networks are most often provided in an AP/Client arrangement. In order to provide proper data communications between the AP and the client device, a proper communication protocol must generally be setup and configured between the devices. The need for creating a secure communication channel has added to the complexity of the setup and configuration of the communication channel between the AP and the client device. Typical security precautions involve both the AP and the client device being provided with some matching configurations. The security mechanisms hinder the ease of setup of the AP and the client device for typical users and often require manual setup steps of both the AP and the client device. Further, once a secure network has been configured, modifications or changes to the network are additionally difficult. For example, once a secure network is configured, modifications or changes may require making the network temporarily insecure and/or unavailable for use.

In order to ease the setup and configuration process various techniques have been utilized in the past. One group of techniques relates to out of band communication methods. In such techniques, communication channels outside the typical communication channel are utilized. For example, in wireless LANs (WLAN) (such as for example communications under the IEEE 802.11 standards) techniques that utilize USB flash drive and/or cable technology, or RFID technology to communicate configuration information between the AP and the client device have been proposed.

Other techniques have included in-band communication using the WLAN channel to exchange configuration information. Such techniques are known, for example, the Broadcom SecureEZSetup or Athero JumpStart techniques. However, such in band communication techniques still typically include certain dedicated hardware such as buttons, switches, or LEDs that the user must evaluate or set. Additionally, the level of security afforded by such mechanisms may be lower than desired.

In general, it would be desirable to provide a more cost efficient, more secure and more user friendly method for setting up and configuring communication channels between AP and client devices, particularly for wireless protocols.

A wide range of types of systems may benefit from improved methods of setting up and configuring communication channels between an AP and client device. As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A method and system are disclosed for setting up and configuring a LAN. More particularly, secure communications may be configured between an access point and a client device. Virtual AP technology is utilized to assist the configuration of the network. In particular, at least two wireless networks are provided in a single AP, a configuration LAN and an operational LAN, by utilizing virtual AP technology. The configuration LAN is utilized to provide communication between the AP and the client devices that is related to network setup, configuration, modification, etc. and the operational LAN provides normal LAN data communication. The configuration LAN may be provided in a relatively open manner that eases setup of that communication channel and the operational LAN may be provided in a more fully secure communication channel. Different service set identifiers (SSIDs) may be provided for configuration LANs and operational LANs so as to more easily identify the type of LAN through its SSID.

In one embodiment, a method of connecting a client device to an access point is provided. The method may include utilizing a configuration LAN to provide an initial connection between the client device and the access point and switching to an operational LAN to provide a connection between the client device and the access point after the configuration LAN connection is established. The configuration LAN and the operational LAN are configured as separate LANs and the operational LAN is more secure than the configuration LAN.

In another embodiment, a network access point is disclosed. The network access point may include a configuration LAN interface wherein the configuration LAN interface communicates configuration traffic for establishing a connection with a client device, the configuration traffic having limited logical boundaries to which it may be transmitted. The network access point may further include an operational LAN interface, wherein the operational LAN interface communicates communication traffic of an operational LAN to the client device, the operational LAN and the configuration LAN being separate LANs operating through the network access point. In addition the operational LAN may be a more secure LAN as compared to the configuration LAN.

In another embodiment, an information handling system is disclosed. The information handling system may include a wireless access point, a configuration LAN and an operational LAN. The configuration LAN may process configuration and setup settings for connecting the wireless access point and a client device. The configuration LAN and the operational LAN are both transmitted through the wireless access point wherein the operational LAN processes normal LAN traffic between the wireless access point and the client device. Further logical boundaries are provided within the information handling system limiting the configuration LAN traffic to only a portion of the information handling system.

In still another embodiment, a LAN identifier format is disclosed. The format may comprise a plurality of characters of which a subset of characters identify whether the LAN is at least one of a configuration LAN or an operational LAN.

In still another embodiment, a method of identifying a wireless LAN is disclosed. The method may include generating or receiving a multi-character service set identifier value and utilizing at least a portion of the multi-character service set identifier value to identify whether the wireless LAN is at least one of a configuration LAN or an operational LAN. The method may be performed in either of an access point or a client device.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
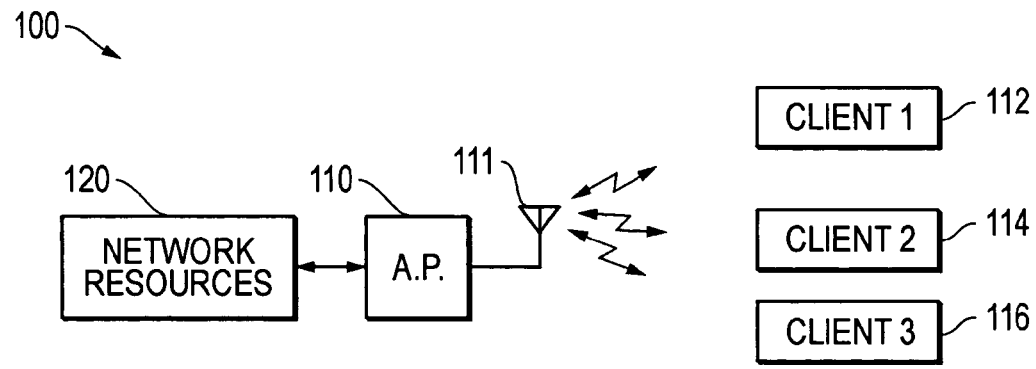
FIG. 1 illustrates a wireless local area network.

As described in more detail below, a technique is disclosed herein for disclosed for setting up and configuring a WLAN. More particularly, secure communications may be configured between an AP and a client device by utilizing Virtual Access Point (virtual AP) technology. Virtual AP technology is known to allow the creation of multiple service set identifiers (SSID) on a single AP. For example, typical WLANs have a unique SSID for each basic service set (BSS) such that all access points and devices attempting to connect to the specific LAN utilize the same SSID. However, virtual AP technology provides multiple SSIDs on a single AP thus creating multiple wireless virtual LANs (VLANs). Such techniques have been used to allow multiple ISPs to share a single AP, and to address QoS, load balancing, and bandwidth allocation issues. Typically a client will be provided access to only one VLAN and not the others According to the techniques described herein, virtual AP technology may be used to aid in the configuration and setup of an AP and client device. In particular, at least two wireless networks may be provided for in a single AP, a configuration LAN and an operational LAN utilizing virtual AP technology. The configuration LAN is utilized to provide communication between the AP and the client devices that is related to network setup, configuration, modification, etc. and the operational LAN provides normal LAN data communication. The configuration LAN may be provided in a relatively insecure manner that eases setup of that communication channel and the operational LAN may be provided in a more fully secure communication channel. The techniques described herein beneficially balance cost, security and ease of use variables.

More particularly, the configuration LAN and the operational LAN may each be provided with its own SSID and security settings. The creation of the virtual APs and VLANs may be accomplished in firmware and as mentioned above may utilize a common AP, thus minimizing the need for additional hardware and the associated costs of such hardware. Though described herein with reference to an AP that is configured into two virtual networks, it will be recognized that the techniques described herein may be utilized with regard to APs that are configured to support more than two networks. Further to aid in the understanding of the concepts described herein, the techniques described below are discussed with reference to a WLAN (such as the various common IEEE 802.11 standards), however, with the benefit of this disclosure it will be recognized that the concepts described herein are not limited to WLAN applications and may be utilized in other LAN applications.

In one embodiment, a configuration WLAN may be utilized between a wireless AP and a wireless client in which the AP has SSID broadcasting open (or enabled) and no security protocols turned on. In this manner the configuration WLAN would be clearly visible and relatively easy to connect to even for users that are not technically savvy as the user would not have to at this point negotiate through the typically more complex techniques, settings and the like. In this manner an initial association and authentication may occur between the AP and the client device. At this point, the AP and the wireless device may communicate the appropriate settings and security parameters to implement connectivity between the AP and the client device through the operational WLAN. When such data has been communicated, the configuration WLAN connection between the AP and the client device may be disassociated and the operational WLAN (with its increased security provisions) may be associated between the AP and the client device. For example, the operational WLAN may have SSID broadcasting disabled, may utilize security encryption/key protocols, etc. In this manner initial communication may be established through the configuration WLAN which to a user provides an improved ease of use experience and then after the association of the client and the AP, communication may then be transferred to the operational WLAN. Firmware may automatically accomplish the transfer to from the configuration WLAN to the operational WLAN in a manner that is seamless to the user. In this manner a client and an AP may be associated in a manner that allows even unsophisticated users a desirable ease of use experience yet results in a final operating communication mode that is relatively secure.

The configuration WLAN is advantageous in that it is an in-band communication technique for initial setup and configuration. Further, the configuration WLAN may be available for both initial network configuration and also for subsequent network modifications, additions, etc. Thus, the configuration WLAN may continue to be utilized to add additional clients. So as not to limit the available overall communication resources for normal data communications between the AP and client devices, the configuration WLAN may operate at relatively low speeds. This reduces the system load imposed by the configuration WLAN and maximizes the bandwidth available for the operation WLAN.

Because the configuration WLAN is provided in a less secure manner that is more easily open and available to users (and thus potentially more open to abuses and security breaches), the configuration WLAN is configured to have limited functionality for configuration purposes only. For example, the configuration WLAN may be provided so that all network traffic on the configuration WLAN terminates at the AP. Thus, the configuration WLAN can not be utilized to access the internet, other backbone resources of the network that the AP is connected to, other clients that are connected to the AP, etc. In this manner, overall network security is maintained. Thus, the configuration WLAN is relatively easy to "see" and connect to but because it has limited functional capabilities the network is still relatively secure. Though described above with reference to the configuration WLAN terminating at the AP, this is just one example of how the configuration network may be limited to a logically bounded area. For example, the logically bounded area of the configuration network could be broader and include a router, switch, or other network resource that is coupled to the AP. Thus, all network traffic would be terminated at such router, switch or other network resource. In such an example, the network is constructed in a manner such that there are some logical boundaries at which configuration WLAN traffic is terminated, thus providing a level of security to the overall system outside the bounds of the logical boundaries of the configuration WLAN.

FIG. 1 illustrates an exemplary LAN 100 in which the techniques described herein may be utilized. Some or all the components of the LAN 100 may, in one example, be a part of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As shown in FIG. 1 the LAN 100 may include an AP 110 that is connected to network resources 120 which may include routers, switches, servers, network clients, computers, or any other network resources. The AP 110 may include one or more antennae 111 for communicating with one or more clients 112, 114, and 116. As mentioned above, although a WLAN is shown in FIG. 1 to aid the understanding of the techniques described herein, it will be recognized that the techniques will be applicable to a wide variety of types of LANs.

Figure 2:
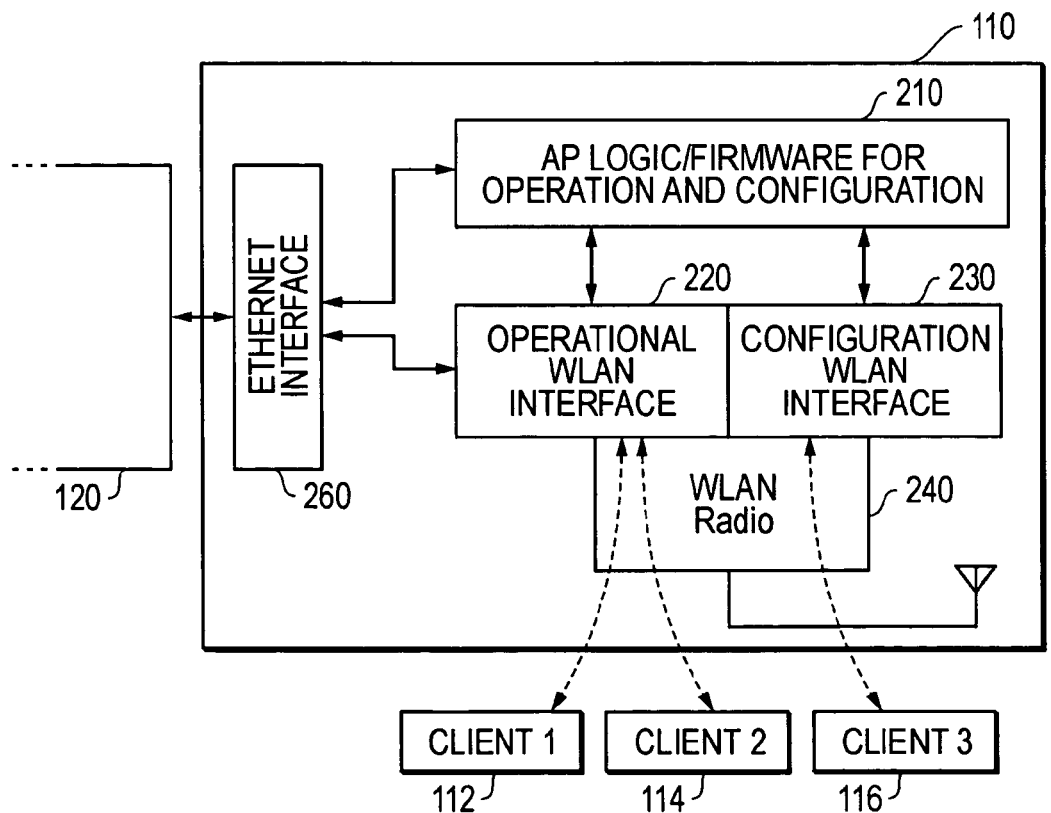
FIG. 2 illustrates an access point supporting both a configuration LAN and an operational LAN.

FIG. 2 illustrates in more detail an AP 110 which supports both a configuration WLAN and an operational WLAN. As shown in FIG. 2, the AP 110 may include logic and firmware 210 for supporting both an operational WLAN interface 220 and a configuration WLAN interface 230. Both the operational interface WLAN 220 and the configuration interface WLAN 230 may be coupled to the WLAN radio hardware 240 of the AP 110. Communications received by the WLAN radio 240 may thus include both configuration WLAN communications and operational WLAN communications. As the configuration WLAN and the operational WLAN utilize different SSIDs, communications for the configuration WLAN may be processed through the configuration WLAN interface and communications for the operational WLAN may be processed through the operational WLAN interface. Firmware or software may be provided within the access point so as to properly direct communication traffic to either the configuration WLAN interface or the operation WLAN interface depending upon the type of communication traffic. Operational WLAN communications may be provided to an Ethernet interface 260 for further communication to the network resources 120. Though illustrated as an Ethernet connected AP, it will be recognized that the AP 110 may be connected to the other network resources through any of a wide range of communication protocols and the Ethernet connection is merely representative and not required to take advantage of the techniques described herein. For example, the AP could also be connected to other network resources through other connections such as power line networking, phone line networking, coaxial cable networking, fiber, etc.

FIG. 2 further illustrates an example of a LAN in which three client devices 112, 114 and 116 are communicating with the AP 110. More or fewer clients may be used as FIG. 2 is merely meant to illustrate the use of both an operational WLAN and a configuration WLAN. As shown in FIG. 2, client devices 112 and 114 are communicating (as indicated by the dashed lines) in an operational WLAN mode through the WLAN radio hardware 240 and the operation WLAN interface 220. Client devices 112 and 114 would have previous been connected to the LAN through a setup and configuration process (for example, using the configuration WLAN) and have now been switched over to the operational WLAN. The client device 116 is shown as communicating with the configuration WLAN mode through the WLAN radio hardware 240 and the configuration WLAN interface 230. Thus client device 116 is attempting to establish a connection with the LAN. As shown with respect to FIGS. 1 and 2 the AP may be a designated access point device. However, it will be recognized that the access point functionality may be embedded in other devices of an information handling system, such as for example, routers, switches, servers, computers, etc. and the designation as an AP is not limited to stand alone AP devices. Furthermore, though shown in FIG. 2 has utilizing common WLAN radio hardware, separate dedicated radio hardware could be provide for each of the operation LAN and the configuration LAN.

Figure 3:
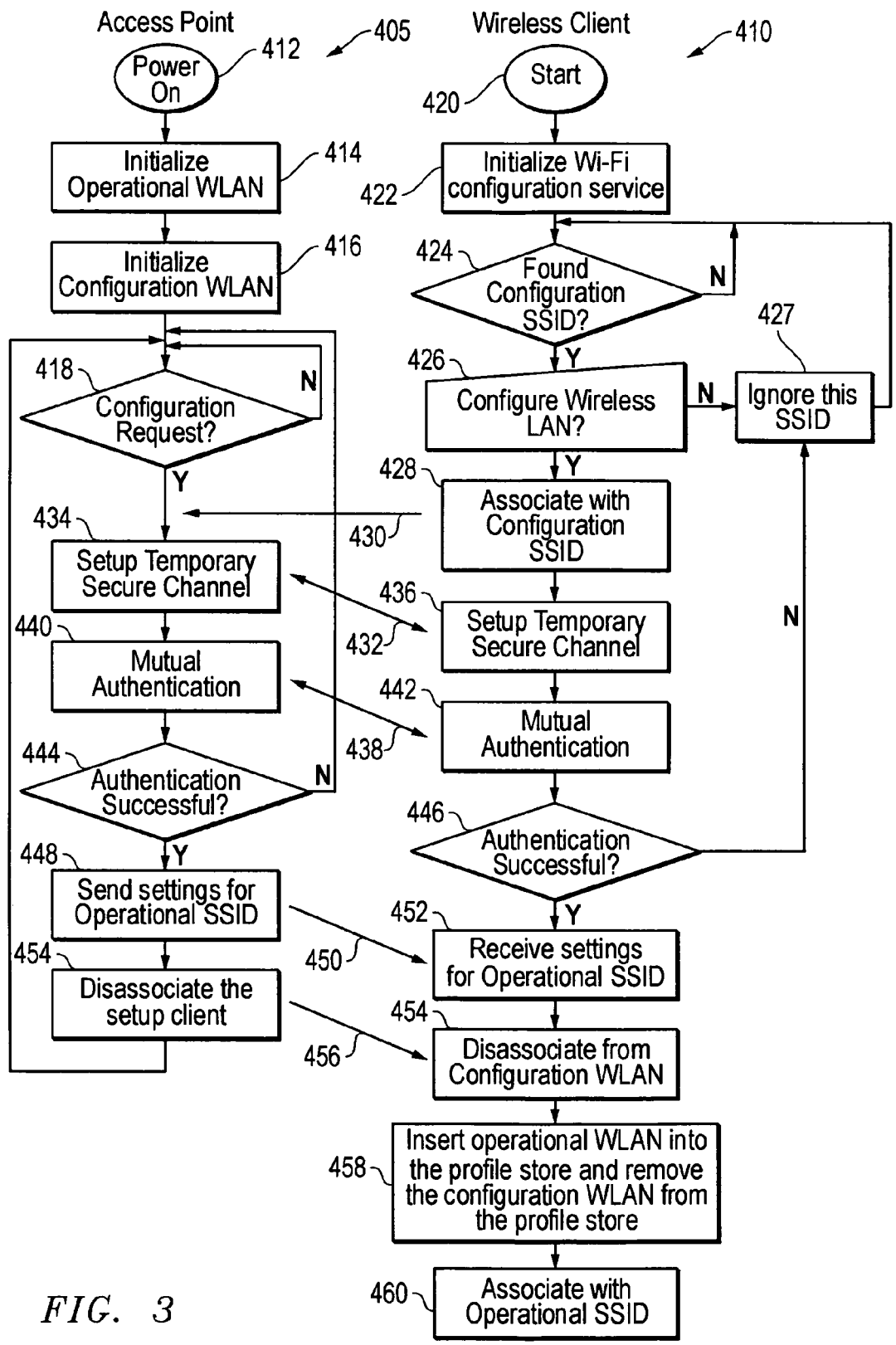
FIG. 3 illustrates an exemplary flowchart for setup and configuration of a LAN connection utilizing both a configuration LAN and an operational LAN.

FIG. 3 illustrates an exemplary flowchart of the setup and configuration process utilizing a configuration WLAN and the ultimate establishment of communications over an operational WLAN. As shown in FIG. 3, the flowchart illustrates the activity flow 405 in an AP and the activity flow 410 in client device. At the AP side, after power is turned on at step 412, the AP initializes both the operational WLAN and the configuration WLAN settings within the AP at steps 414 and 416. The initialization of the configuration WLAN settings at step 416 may include starting to broadcast the SSID for the configuration WLAN. The AP is then merely waiting at a configuration request step 418 for a client device to request connection to the LAN through a configuration request.

On the client side, after the client is powered on and is not already connected to an operational WLAN at step 420, the WLAN service within the client is activated by initializing the wireless configuration service at step 422. At step 424, the client device is waiting to detect a broadcasted configuration SSID. In one example, the detection of a broadcasted SSID may be performed as a background service of a client side operating system (for example a Microsoft Windows operating system) that activates whenever the wireless hardware is turned on. Alternatively, such functionality may be provided within the client side wireless software/hardware. When the client device detects a configuration SSID provided by an AP, control in the client device then moves to step 426. At step 426, a decision is made as to whether to configure the client device for the LAN associated with the detected configuration SSID. If a decision is made not to associate with the detected SSID (such as a user not selecting the detected LAN), control passes to step 427 in which the detected SSID is ignored and control then returns to step 424 again as shown. When the decision is made at step 426 to connect to a detected LAN, control moves to step 428 at which point the association with a configuration WLAN that is identified by the selected configuration SSID is made. At this point, the client device initiates communication with the AP as indicated by communication line 430 to establish a connection with the AP according to the protocol for the communication standard that is being utilized.

When a communication connection between the AP and client device has been established, the AP device and client device may then communicate further as shown by communication line 432 to setup a temporary secure channel as shown by steps 434 and 436 (e.g. Diffie-Hellman based protocol). When a secure channel is established further communication 438 may occur to complete the mutual authentication process as shown in steps 440 and 442 (e.g. PIN verification). Steps 434, 436, 440 and 442 provide a mechanism to temporarily create and authenticate a temporarily secure communication channel even though the channel is initiated in an open environment. Any of a variety of methods may be used that allow a software configurable secure channel to be temporarily established and authenticated and the techniques for the use of a configuration WLAN and operational WLAN as described herein are not limited to any particular technique. One such technique that may be utilized is disclosed in pending U.S. patent application no. 2005/0160287 entitled METHOD TO DEPLOY WIRELESS ROUTER filed Jul. 21, 2005 by Mehta et al., the disclosure of which is expressly incorporated herein by reference; however, other techniques may be used.

If the AP detects that the temporarily secure communication channel has been established and authenticated, control moves from AP step 444 to AP step 448. If the client device detects that the temporarily secure communication channel has been established and authenticated, control moves from client step 446 to AP step 452. If either the AP or client device determine that authentication was not successful, then control returns to the AP step 418 and the client step 427 as shown and the process repeats as described above.

After a secure and authenticated channel has been established, the AP may then send to the client device the settings for the operational WLAN including the operation SSID and other associated security encryption codes/keys, and the like. This is indicated at the AP step 448, communication line 450 and client device 452 in which the settings for the operational WLAN are sent from and to the AP and client device respectively.

After the AP has sent the setting for the operational WLAN, the AP may then disassociate the configuration WLAN from the client device as indicated in step 454. The AP configuration WLAN of the AP device may then have control returned to step 418 to await the next configuration request. At this point the AP device may await further communications from the client device over the operation WLAN. On the client side, after the operational WLAN settings are received at step 452, control moves to step 454 where configuration WLAN disassociation communication 456 is provided from the AP. At this point the client device also disassociates from the configuration WLAN. Next, at step 458 the settings for the configuration WLAN are removed from the setting profiles in the client and replaced with the settings for the operational WLAN. Finally, at step 460 the client device associates with the operational WLAN by providing the operation SSID and security settings to the AP according to the protocol of the standard under which the AP and client device are operating.

The techniques described herein may be utilized in a system in which the configuration LAN and the operational LAN both communicate according to the same technology standard. Thus, in one example and operational WLAN and a configuration WLAN may both communicate according to an 802.11 standard. However, the operational LAN and the configuration LAN may communicate according to different technology protocols also. Thus, for example, the operational communications may occur according to one standard and the configuration communication may occur according to another standard. In one example the configuration communication may occur according to an 802.11 protocol while the operation LAN may communicate according to a Wi-Max or Cellular protocol. In such configurations, reference to "an access point" may refer to a single access point device that conforms to both standards or may refer to two separate devices (one for each standard) that operate together and together may be viewed to form "an access point."

Figure 4:
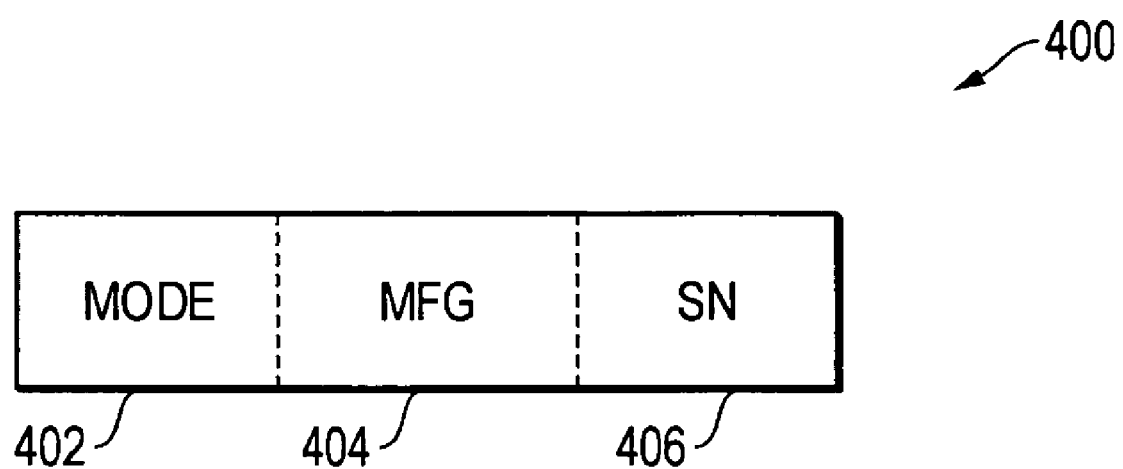
FIG. 4 illustrates an exemplary SSID format that includes a MODE field to identify a LAN as a configuration LAN or an operational LAN.

The SSID data formats that are utilized for the techniques described above may be formats such as known in the current art. For example, the SSID may be a 32 character string such as commonly used in WLANs. When utilizing an operational LAN and configuration LAN, however, it may be beneficial to utilize the knowledge of such a system to define a particular format for the SSID characters (this would avoid potential duplicate SSIDs). For example, with a standard 32 character string SSID, the particular characters may include identifiers that designate the SSID as a configuration SSID or an operational SSID. In this manner, the SSID may be more readily identified by client devices as a potential configuration SSID. One example of such a technique is shown in FIG. 4. As shown in FIG. 4, the 32 characters available for use as an SSID 400 may be split into a MODE field 402, a manufacturer field 404, and a serial number field 406. In the MODE field, the characters may be set to a designator value that such as either "config" or "op" to designate the SSID as belonging to a configuration LAN or operational LAN respectively. In this manner, the type of LAN may be more readily identified by the SSID data itself. Further within the processes and steps described above, the client devices may be designed to automatically only seek SSIDs having the configuration SSID designation when initially searching for a configuration SSID to begin the establishment of a network connection. Other processes may also take advantage of identifying within the SSID itself whether the SSID relates to an operational LAN or a configuration LAN. Although described herein with reference to a mode field located at the beginning of the SSID characters, it will be recognized that the mode field could be located in other portions of the SSID character string. In addition, in one alternative SSIDs may be considered to default to one type of SSID (configuration or operational) and the MODE field need only be populated for the other type of SSID.

As described above the connection to an operational LAN is achieved through first connecting to a configuration LAN. It will be recognized that such techniques may also be utilized in LAN systems that allow a user to bypass the configuration LAN steps. Thus, the systems described above may allow for a client device to bypass the configuration LAN step when the user knows the operational LAN settings. Alternatively, if a connection becomes disconnected, a client may re-connect to the operation LAN through use of the previously determined operation LAN settings without having to perform the configuration LAN steps described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention. For example, the various communication protocols described herein (such as 802.11a/b/g/n, WPAN, 802.16 (or Wi-MAX), Cellular technologies, etc.) are merely exemplary and it will be recognized that other current and future standards may equally utilized the techniques described herein. Furthermore, the prioritization classes described herein are merely exemplary and other classes of traffic and/or other levels of priority may be utilized while still providing the benefits of the concepts disclosed herein.

What is claimed is:

1. A method of connecting a client device to an access point, comprising:
    utilizing a wireless configuration LAN to provide an initial connection between the client device and the access point; and
    switching to an operational LAN to provide a connection between the client device and the access point after the configuration LAN connection is established,
    wherein the configuration LAN and the operational LAN are configured as separate LANs and
    wherein the operational LAN is more secure than the configuration LAN.

2. The method of claim 1 wherein the configuration LAN and the operational LAN have different identifiers.

3. The method of claim 2 wherein the operational LAN is a wireless LAN and the identifiers are SSID values.

4. The method of claim 1 wherein the switching to an operation LAN comprises the transmitting operational settings from the access point to the client device.

5. The method of claim 4 further comprising disassociating the configuration LAN connection between client device and the access point.

6. The method of claim 4 further comprising utilizing the transmitted operational settings to connect the client device to the access point to establish the operational LAN connection.

7. The method of claim 1 wherein the configuration LAN has terminated logical boundaries such that configuration LAN connections have more limited boundaries as compared to operational LAN connections.

8. The method of claim 1 wherein the access point creates multiple identifiers through the use of at least one virtual LAN.

9. The method of claim 1 wherein the configuration LAN communicates according to a first technology protocol and the operational LAN communicates according to a second technology protocol.

10. The method of claim 9 wherein the access point comprises a single device providing communication according to both the first and second technology protocols.

11. The method of claim 9 wherein the access point is comprised of at least two separate devices, one providing communication according to the first protocol and one providing communication according to the second technology protocol.

12. A network access point, comprising:
    a configuration LAN interface, the configuration LAN interface communicating configuration traffic of a wireless configuration LAN for establishing a connection with a client device, the configuration traffic having limited logical boundaries to which it may be transmitted; and
    an operational LAN interface, the operational LAN interface communicating communication traffic of an operational LAN to the client device, the operational LAN and the configuration LAN being separate LANs operating through the network access point, the operational LAN being a more secure LAN as compared to the configuration LAN.

13. The network access point of claim 12 wherein the network access point is a wireless access point, the network access point further comprising a wireless LAN radio.

14. The network access point of claim 12 wherein both the configuration LAN interface and the operational LAN interface are both coupled to the wireless LAN radio such that at least a portion of the wireless LAN radio is utilized for both configuration LAN communications and operational LAN communications.

15. The network access point of claim 12 wherein the configuration LAN has a first SSID and the operational LAN has a second SSID.

16. The network access point of claim 15 wherein at least one of the first and second SSIDs has one or more characters identifier the SSID as being associated with the configuration LAN or the operational LAN.

17. An information handling system, comprising:
    a wireless access point;
    a wireless configuration LAN, the configuration LAN processing configuration and setup settings for connecting the wireless access point and a client device;
    an operational LAN, wherein the configuration LAN and the operational LAN are both transmitted through the wireless access point, the operational LAN processing normal LAN traffic between the wireless access point and the client device; and
    logical boundaries within the information handling system limiting the configuration LAN traffic to only a portion of the information handling system.

18. The information handling system of claim 17 wherein the logical boundaries are limited to the wireless access point.

19. The information handling system of claim 17 wherein the configuration LAN broadcasts a first LAN identifier.

20. The information handling system of claim 19 wherein the operational LAN has a second identifier that is not broadcast.

21. The information handling system of claim 17 wherein the wireless access point may communicate through both the operational LAN and the configuration LAN at the same time.

22. The information handling system of claim 21 wherein a bandwidth of the configuration LAN is less than a bandwidth of the operational LAN.

23. A LAN identifier format, comprising:
    a plurality of characters; and
    a subset of characters of the plurality of characters, the subset of characters identifying whether the LAN is at least one of a wireless configuration LAN or an operational LAN,
    wherein the configuration LAN provide an initial connection between a client device and an access point and the operational LAN provides a connection between the client device and the access point after the configuration LAN connection is established, and wherein the configuration LAN and the operational LAN are configured as separate LANs.

24. The LAN service set identifier format of claim 23 wherein the subset of characters is a designated MODE field.

25. The LAN service set identifier format of claim 24 wherein the MODE field is at the beginning of the subset of characters.

26. The LAN service set identifier format of claim 23 wherein a designator value for both configuration LANs and operational LANs is provided.

27. A method of identifying a wireless LAN comprising:
providing at least one of a wireless access point or a client device;
generating or receiving a multi-character service set identifier value with one of the wireless access point or the client device and;
utilizing at least a portion of the multi-character service set identifier value to identify whether the wireless LAN is at least one of a wireless configuration LAN or an operational LAN, the configuration LAN and the operational LAN being separate LANs.

28. The method of claim 27, wherein the utilizing step is performed by a wireless client device to identify the type of a received service set identifier.

29. The method of claim 27, wherein the utilizing step is performed by a wireless access point device to identify the type of a service set identifier generated and transmitted by the wireless access point.

30. The method of claim 27 wherein the permitted values of the portion of the multi-character service set identifier include both configuration identifier values and operational identifier values.

\* \* \* \* \*